(12) United States Patent
Xiao et al.

(10) Patent No.: US 7,996,203 B2
(45) Date of Patent: Aug. 9, 2011

(54) METHOD, SYSTEM, AND COMPUTER PROGRAM PRODUCT FOR OUT OF ORDER INSTRUCTION ADDRESS STRIDE PREFETCH PERFORMANCE VERIFICATION

(75) Inventors: Wei-Yi Xiao, Poughkeepsie, NY (US); Dean G. Bair, Bloomington, NY (US); Christopher A. Krygowski, LaGrangeville, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 12/023,457

(22) Filed: Jan. 31, 2008

(65) Prior Publication Data
US 2009/0198964 A1 Aug. 6, 2009

(51) Int. Cl.
G06F 9/44 (2006.01)
G06F 13/10 (2006.01)
G06F 13/12 (2006.01)

(52) U.S. Cl. .......... 703/21; 711/214; 711/217; 711/218; 712/205; 712/206; 712/207

(58) Field of Classification Search .............. 703/21; 711/214, 217, 218; 712/205, 206, 207
See application file for complete search history.

(56) References Cited

U.S. PATENT DOCUMENTS

| | | | | |
|---|---|---|---|---|
| 6,055,622 A * | 4/2000 | Spillinger | .................... | 712/207 |
| 6,430,680 B1 * | 8/2002 | Burky et al. | ................ | 712/225 |
| 6,470,427 B1 * | 10/2002 | Arimilli et al. | ............. | 711/137 |
| 6,795,908 B1 * | 9/2004 | Lee et al. | ........................ | 712/4 |
| 6,976,147 B1 * | 12/2005 | Isaac et al. | ................... | 711/205 |
| 2007/0174555 A1 | 7/2007 | Burtscher et al. | | |

OTHER PUBLICATIONS

Dstride: Data-cache miss-address-based stride prefetching scheme for multimedia processors, Hariprakash et al., 2001 IEEE, pp. 62-70.
The Design of Cost-Effective Stride-Prefetching for Modern Processors, Al-Sukhni et al.
Evaluation of Hardware-Based Stride and Sequential Prefetching in Shared-Memory Multiprocessors, Dahigren et al., 1996 IEEE Transactions on Parallel and Distributed Systems, vol. 7, No. 4, Apr. 1996, pp. 385-398.
Pointer Cache Assisted Prefetching, Collins et al., In Proceedings of the 35th Annual International Symposium on Microarchitecture (MICRO-35), Nov. 2002, pp. 1-12.
Targeted Data Prefetching, Weng-Fai Wong, Dept of Computer Science and Singapore-MIT Allliance, National University of Singapore.

(Continued)

*Primary Examiner* — Kamini S Shah
*Assistant Examiner* — Saif A Alhija
(74) *Attorney, Agent, or Firm* — Cantor Colburn LLP; John Campbell

(57) ABSTRACT

A method, system, and computer program product are provided for verifying out of order instruction address (IA) stride prefetch performance in a processor design having more than one level of cache hierarchies. Multiple instruction streams are generated and the instructions loop back to corresponding instruction addresses. The multiple instruction streams are dispatched to a processor and simulation application to process. When a particular instruction is being dispatched, the particular instruction's instruction address and operand address are recorded in the queue. The processor is monitored to determine if the processor executes fetch and prefetch commands in accordance with the simulation application. It is checked to determine if prefetch commands are issued for instructions having three or more strides.

20 Claims, 8 Drawing Sheets

OTHER PUBLICATIONS z/Architecture, Principles of Operation, Sixth Edition, Apr. 2007, Publication No. SA22-7832-05, copyright IBM Corp. 1990-2007, Part 1.

z/Architecture, Principles of Operation, Sixth Edition, Apr. 2007, Publication No. SA22-7832-05, copyright IBM Corp. 1990-2007, Part 2.

z/Architecture, Principles of Operation, Sixth Edition, Apr. 2007, Publication No. SA22-7832-05, copyright IBM Corp. 1990-2007, Part 3.

z/Architecture, Principles of Operation, Sixth Edition, Apr. 2007, Publication No. SA22-7832-05, copyright IBM Corp. 1990-2007, Part 4.

* cited by examiner

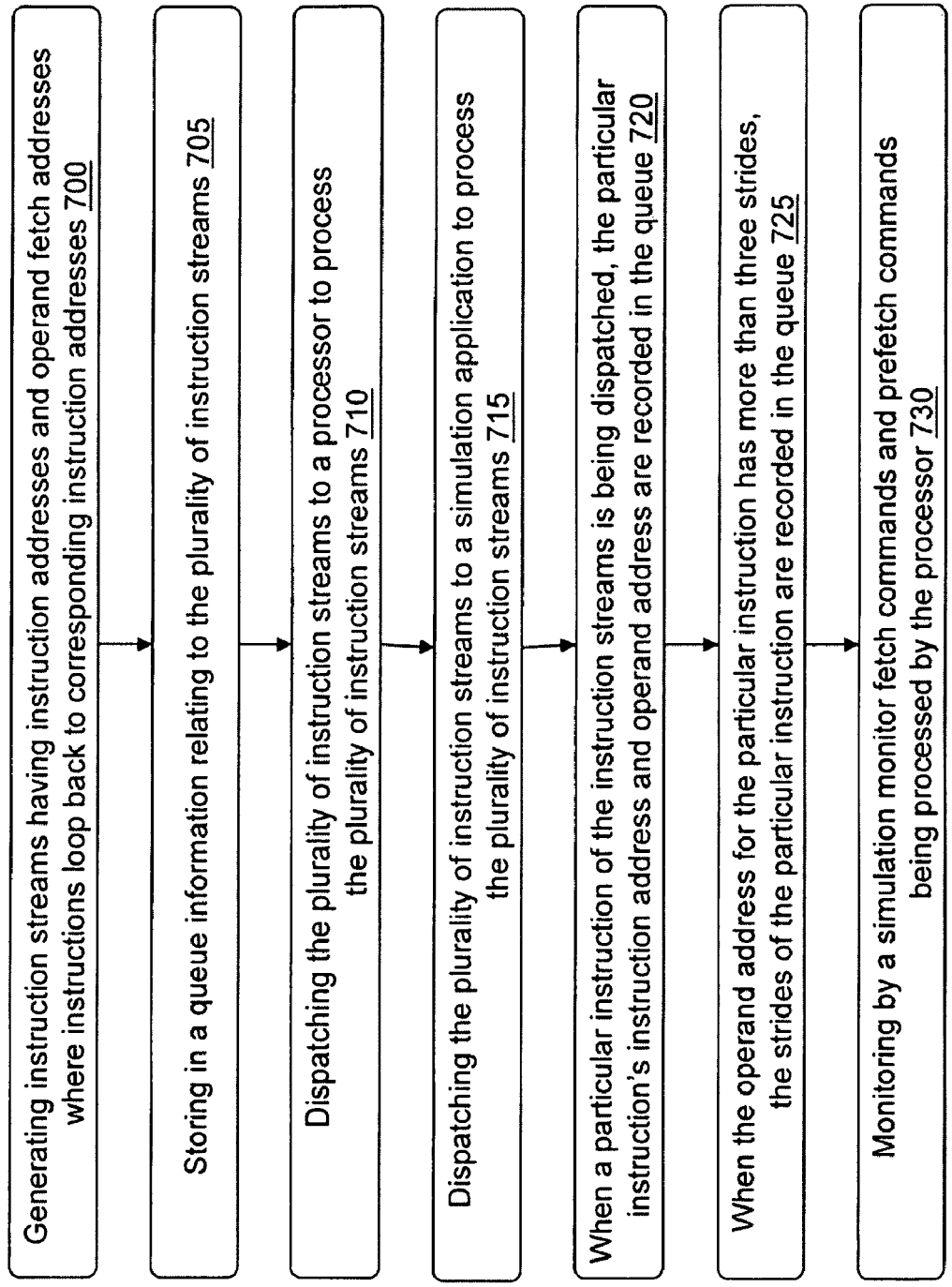

METHOD, SYSTEM, AND COMPUTER PROGRAM PRODUCT FOR OUT OF ORDER INSTRUCTION ADDRESS STRIDE PREFETCH PERFORMANCE VERIFICATION

BACKGROUND

Exemplary embodiments relate to simulation models for monitoring cache prefetch performance in the field of processor designs, and more particularly to verifying the performance of the looping of data crunching in a processor design.

In processor designs, a processor may execute various instruction sets. An instruction set is (a list of) all instructions, and all their variations, which may include arithmetic instructions such as add and subtract, logic instructions such as and, or, and not, data instructions such as move, input, output, load, and store, and control flow instructions such as goto, if . . . goto, call, and return. An instruction set, or instruction set architecture (ISA), is the part of the computer architecture related to programming, including the native data types, instructions, registers, addressing modes, memory architecture, interrupt and exception handling, and external I/O. An ISA includes a specification of the set of opcodes (machine language), which are the native commands implemented by a particular CPU design. Instruction set architecture may be distinguished from the microarchitecture, which is the set of processor design techniques used to implement the instruction set. Computers with different microarchitectures can share a common instruction set.

In today's high performance processor designs, looping on data crunching has become an added design feature to processors to improve the high performance on the intensive workload. Processor design can be a tedious and expensive process.

It would be beneficial to have methods, systems, and computer programs products to ensure that high performance processor designs are performing as planned.

BRIEF SUMMARY OF EXEMPLARY EMBODIMENTS

An exemplary embodiment includes a system for verifying out of order instruction address (IA) stride prefetch performance in a processor design having more than one level of cache hierarchies and a cache controller. A processor executes instructions from memory. A testcase generator is configured to generate multiple instruction streams, where each instruction stream has an instruction address. The instruction address has multiple operand fetch addresses within a prefetch boundary, and instructions in the multiple instruction streams loop back to corresponding instruction addresses for the instructions. A queue is configured to store information relating to the multiple instruction streams. A simulation application is included. When the operand address for a particular instruction of the multiple instruction streams has more than three strides, the simulation application records the strides of the particular instruction in the queue. When the processor issues a fetch command, if the simulation application determines that a fetch command operand address for a line of the processor matches an operand address in the queue, the fetch command being issued by the processor is marked in the queue. The simulation application is configured to search the queue for a first operand address having more than three strides and having the biggest stride when the processor issues a prefetch command. If the first operand address having more than three strides in the queue does not match a prefetch command operand address of the prefetch command, the simulation application issues an error message. If there is a match, the simulation application marks the prefetch command being sent in the queue. If, subsequently, the fetch command is issued on the prefetch command operand address, the simulation application issues an error message to indicate that the prefetch command operand address has already been prefetched.

Another exemplary embodiment includes a method for verifying out of order instruction address (IA) stride prefetch performance in a processor design having more than one level of cache hierarchies. Multiple instruction streams are generated, where each instruction stream has an instruction address (IA). The instruction address has a multiple operand fetch addresses within a prefetch boundary, and instructions in the multiple instruction streams loop back to corresponding instruction addresses for the instructions. Information relating to the multiple instruction streams is stored in a queue. When the operand address for a particular instruction of the multiple instruction streams has more than three strides, the strides of the particular instruction are recorded in the queue. When the processor issues a fetch command, if a fetch command operand address for a line of the processor matches an operand address in the queue, the fetch command being issued by the processor is marked in the queue. The queue is searched for a first operand address having more than three strides and having the biggest stride when the processor issues a prefetch command. If the first operand address having more than three strides in the queue does not match the prefetch command operand address of the prefetch command, an error message is printed. If there is a match, the prefetch command being sent is marked in the queue. If, subsequently, the fetch command is issued on the prefetch command operand address, an error message is issued to indicate that the prefetch command operand address has already been prefetched.

A further exemplary embodiment includes a computer program product, tangibly embodied on a computer readable medium, for verifying out of order instruction address (IA) stride prefetch performance in a processor design having more than one level of cache hierarchies. The computer program product includes instructions for causing a computer to execute the above method.

BRIEF DESCRIPTION OF THE DRAWINGS

Referring now to the drawings wherein like elements are numbered alike in the several FIGURES:

FIGS. 7A and 7B illustrate a method for verifying processor design in accordance with exemplary embodiments.

DETAILED DESCRIPTION OF EXEMPLARY EMBODIMENTS

Exemplary embodiments provide a simulation model to verify the performance of the looping on data, crunching design features. Instructions with the same instruction address (IA) that are doing operand fetch (into the cache hierarchy) are simulated and monitored in this disclosure. The number of operand fetches per instruction are recorded to determine the strides of a particular instruction address, and when a pattern is formed from these strides, the prefetch of the forward (+) or backward (−) lines is closely monitored from the cache hierarchy. When there are many instructions at the same time that are doing the looping, the distance of the strides are measured, and the bigger stride of the operand fetch from the instructions is allowed the prefetch ahead of other instructions. Accordingly, the prefetch is out of order of the instruction streams that required prefetches.

As discussed herein, there may be two parts in the simulation model, which are a testcase generator that generates instructions with operand fetch addresses within the prefetch boundary and loops back to the same instruction address, and a simulation monitor that monitors the fetch/prefetch events of the hardware behavior.

Figure 1:
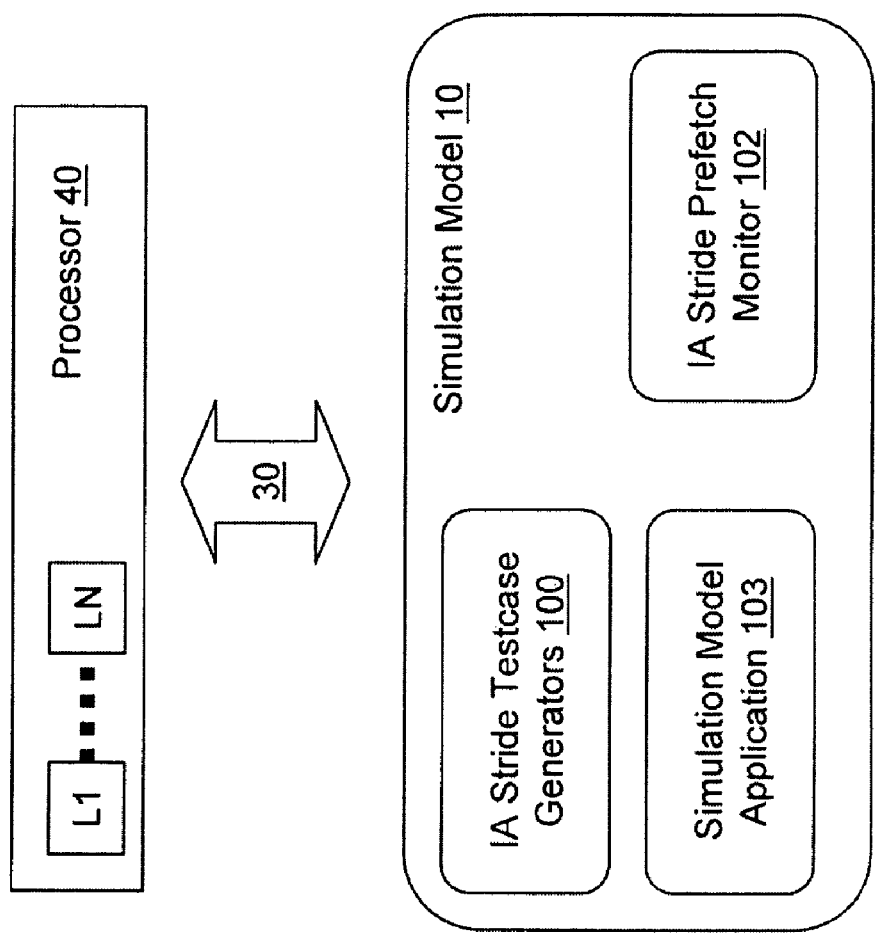
FIG. 1 illustrates simulation model structures in accordance with exemplary embodiments.

FIG. 1 illustrates a block diagram of an exemplary layout of an instruction address stride prefetch simulation model 10 in accordance with exemplary embodiments. The simulation model 10 may reside in a UNIX box, which may be computer equipment that is used to run the simulation, and the operations of a UNIX box are understood by those skilled in the related art. The simulation model 10 is not limited to a UNIX box and may be incorporated in other equipment capable of implementing exemplary embodiments. Also, the simulation model 10 may reside in the actual device that is being tested, such as a server. The simulation model 10 may be used to verify the processor design of one or more processors 40. The processor 40 may include a plurality of caches (e.g., L1, L2 . . . LN) in a cache hierarchy. The processor 40 is capable of executing instructions from the plurality of caches L1 through LN. A cache controller (not shown) can be used to operate the plurality of caches in exemplary embodiments. The processor 40 may be implemented in VHDL, which is VHSIC (very high speed integrated circuits) hardware description language. Also, the processor 40 may be in a computing system, such as a server. Arrow 30 represents a connection between the processor 40 being tested and the simulation model 10, and the connection may be implemented in varied ways as understood in the related art.

The simulation model 10 may include an IA stride testcase generator 100 and a IA stride prefetch monitor 102. The testcase generator 100 generates processor instructions in a file containing instruction addresses (and instructions with operand fetch and store addresses). The testcase generator 100 generates random data located in these operand addresses. The simulation model 10 also includes a simulation model application 103 configured to perform the operations of the simulation model 10 as discussed herein. Although the simulation model 10 and the simulation model application 103 are illustrated as two separate models, it is understood that the simulation model 10 and the simulation model application 103 may be implemented as a single module in exemplary embodiments.

Figure 2:
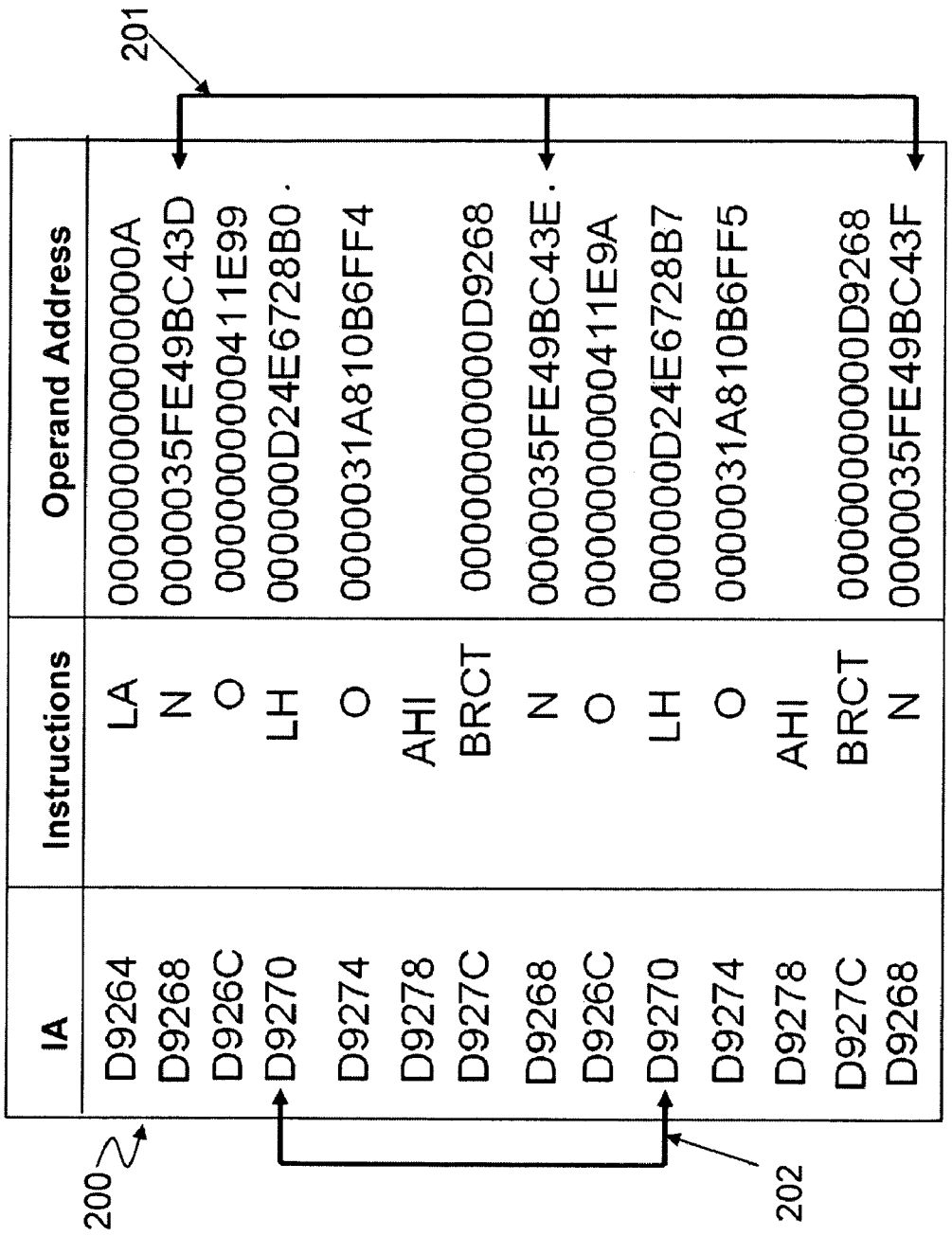
FIG. 2 illustrates an output from a testcase generator in accordance with exemplary embodiments.

For example, the testcase generator 100 generates instructions addresses (IA) and operand fetch addresses within a prefetch boundary (e.g., a 2kilobyte boundary), and the instruction addresses loop back to the same instruction address (e.g., as illustrated in FIG. 2). The testcase generator 100 provides an input to the simulation model application 103. The simulation model application 103 verifies the IA (instruction address) stride prefetch performance and correctness of the prefetch. The simulation monitor 102 monitors the performance of the processor 40 (or plurality of processors). The processor 40 may be CP processors including several levels of caches.

When an instruction is being executed by the simulation model application 103, the following are recorded in a queue (e.g., queue 300 illustrated in FIG. 3) of the simulation monitor 102: the operand fetch address, number of strides of this addresses, distance of the stride, forward or backward strides, fetch command sent, and prefetch blocked. The results of the queue 300 are compared to the actual results of the processor 40 to, e.g., verify the processor design of the processor 40.

When the number of strides is more than three times, there should be a prefetch in the processor 40 of either the forward or backward lines depending on the strides. All of the fetch commands of the processor 40 are being monitored by the simulation monitor 102. If a prefetch command goes out, the database (e.g., the queue 300) of the computer is being searched to find the operand addresses that have more than three strides. If a prefetch command had not been issued, the address with the biggest stride among the operand addresses should perform the prefetch on the forward or backward lines. If the prefetch addresses (of the processor 40) do not match the expected line (of the queue 300), an error message is printed out in the simulation model 10. The strides within the operand addresses may be limited to certain sizes in some hardware designs. If the stride is out of the prefetch boundary, a prefetch is not expected to occur for that particular instruction address (IA). If the operand addresses are the same for the same IA, no stride is recorded. At the end of simulation, the number of prefetched lines are calculated over the total number of projected IAs to be prefetched to determine the performance of the IA stride prefetch performance by the processor 40. The simulation model 10 provides simulation features to monitor and verify the new hardware design in a processor, such as the processor 40, in accordance with exemplary embodiments.

FIG. 2 illustrates an output 200 of the testcase generator 100 in accordance with exemplary embodiments. In the output 200, it can be seen that multiple instructions are looping within the same instruction addresses, and the instruction addresses have striding data addresses (or operand addresses).

In FIG. 2, the output 200 has three columns. In the left column, the output 200 illustrates the instruction addresses (IA). In the middle column, the output 200 illustrates the actual processor instructions such as LA (load address), N (And instruction), O (Or instruction), or LH (load half word). In the right column, the output 200 illustrates the data fetch/store addresses (operand addresses) for these instructions.

In FIG. 2, line 201 illustrates that the instruction of N is looping with the instruction address of D9268and that the instruction of N is doing data fetching at operand addresses of 0000035FE49BC43D, 0000035FE49BC43E, and 0000035FE49BC43F. The instruction of N has an IA stride of 1as the operand addresses for N increases (increments).

Also, line 202 illustrates that the instruction of LH is looping with the instruction address of D9270and that the instruction of LH is doing data fetching at operand addresses of 000000D24E6728B0and 000000D24E6728B7. The instruction of LH has an IA stride of 7.

Figure 3:
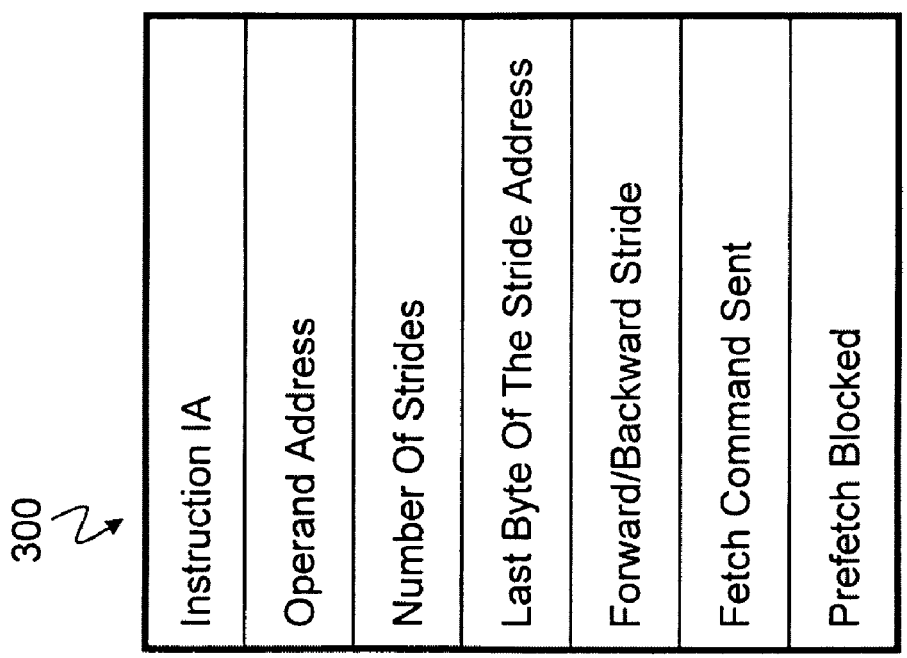
FIG. 3 illustrates an exemplary layout for an instruction address stride prefetch queue used to monitor the fetch and prefetch events during the data fetches in accordance with exemplary embodiments.

FIG. 3 illustrates an exemplary layout of the IA stride prefetch queue 300 of the simulation monitor 102. The queue 300 may store the instruction address for each instruction (such as instruction N), the operand fetch/store address for this instruction, the number of strides for this particular instruction address (e.g., IA of D9268), the last byte of the stride address, the forward and/or backward strides, the fetch command sent, and the prefetch blocked.

Figure 4:
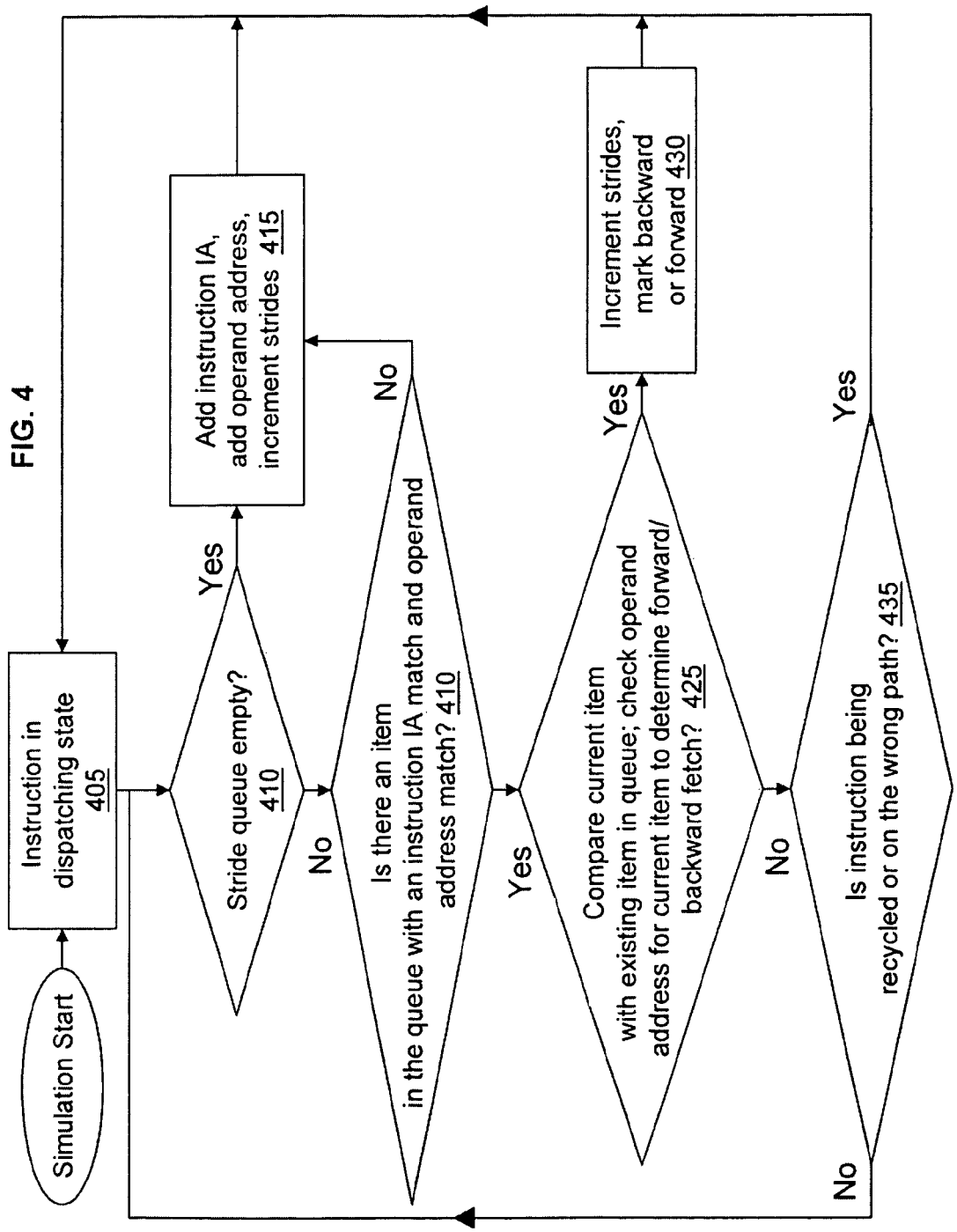
FIG. 4 illustrates simulation diagrams in accordance with exemplary embodiments.

FIG. 4 illustrates a simulation diagram of instructions being processed in the simulation model 10 in accordance with exemplary embodiments. FIG. 4 also illustrates how the simulation model 10 determines that its components (such as the instruction address, operand address, and number of strides) are being added into the prefetch queue 300 of the simulation monitor 102 for processing.

When simulation starts, instructions generated by the testcase generator 100 are dispatched into the simulation model application 103 at 405. If it is determined that the current (IA stride prefetch) queue 300 is empty and the instruction is doing data fetching at 410, the simulation model application 103 adds the instruction with its properties to the (IA stride) queue 300 and then marks the instruction being loaded for monitoring by the monitor 102 at 415. If the queue 300 is not empty at 410, the simulation model application 103 determines if there is an item in the queue that has an instruction address (IA) match and/or an operand match at 420.

When an instruction does not have any IA match and operand address match (the operand address may be incremented or decremented in the last two digits) within the defined boundaries in the queue 300 at 420, the operations of the simulation model application 103 adds this instruction as a new item to the queue 300 with all the instruction's properties at 415.

If there is a match for the instruction address (such as D9268for N) and if the first 52bits of the data address (operand address) matches an existing item (assuming 128 bytes per cache line) in the queue 300 at the operation 415, then the stride of the instruction is compared to the existing item in the queue 300 at 425. If the stride of the instruction is greater, the instruction is a forward stride, the number of strides for that instruction can be increased by one, and the item is marked as forward stride at 430. If the stride is less, the item is marked as a backward stride and the number of strides will be increased by 1also at 430.

During simulation in the simulation model 10, this instruction could be on a wrong branch path or a recycled path in a processor design of the processor 40 at 435. In such case, the instruction is to be routed back for re-dispatching at operation 405, and information about this instruction is not loaded into the (IA stride) queue 300. If not, the simulation continues for the next instruction. The various processes discussed herein are repeated for each instruction according to exemplary embodiments.

Figure 5:
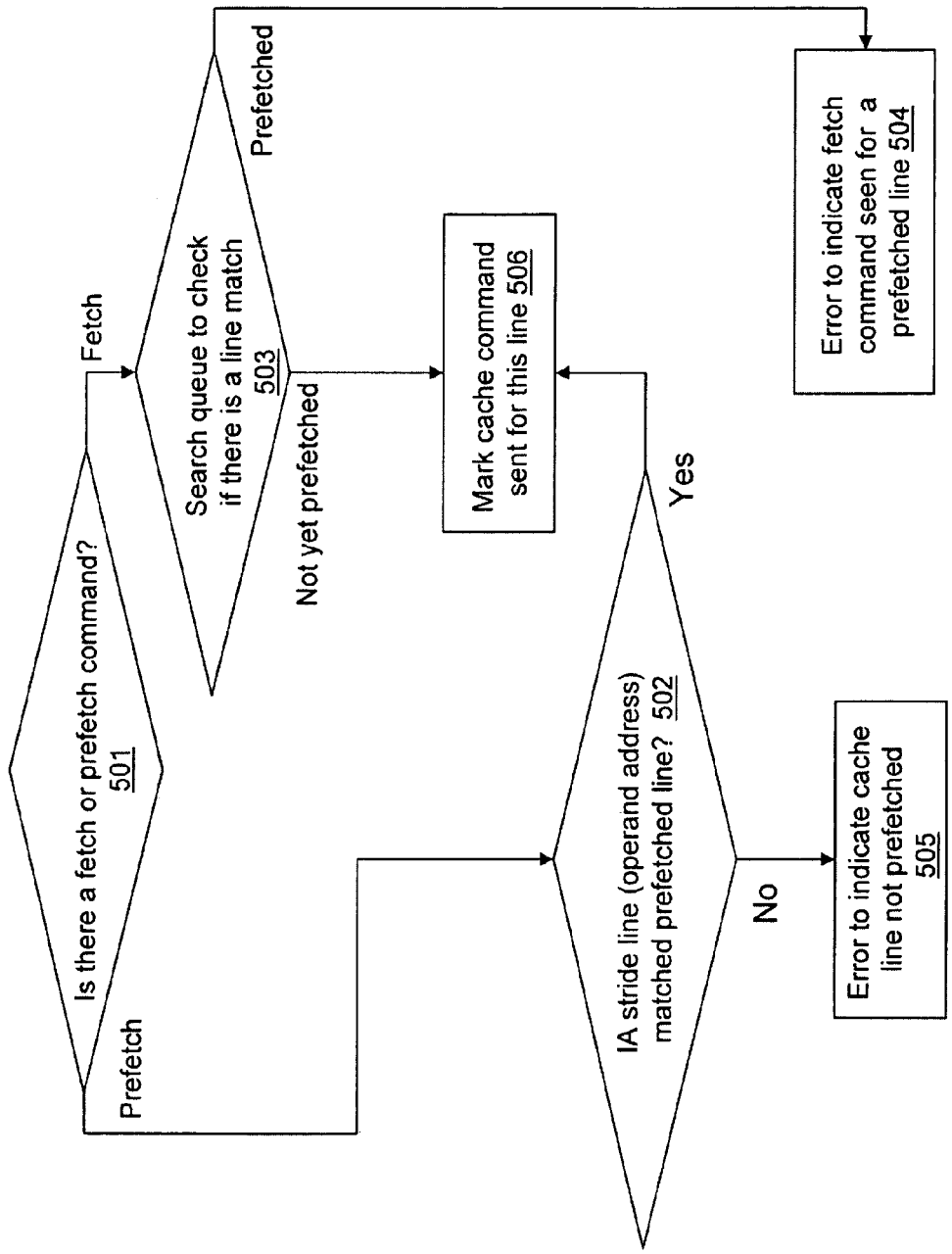
FIG. 5 illustrates exemplary operations of the simulation monitor during simulation in accordance with exemplary embodiments.

FIG. 5 illustrates exemplary operations of the simulation monitor 102 during simulation in accordance with exemplary embodiments. Also, FIG. 5 illustrates how the simulation monitor 102 correlates to the fetch/prefetch commands of the processor 40 and marks the lines being sent or lines that have an error condition.

For each simulation cycle of the simulation model 10, the simulation monitor 102 monitors cache prefetch and fetch commands of the processor 40, and the simulation model 10 determines if there is a fetch or prefetch command at 501. If a fetch command is seen by the simulation monitor 102, the queue 300 is searched to determine if there is a line of the processor 40 matched together with the IA of the queue 300 at 503. If a match if found at operation 503, and the line being prefetched by the processor 40 has already been marked, an error message is printed out to indicate that a prefetched line is being fetched again at 504. If the line has not been prefetched by the processor 40, the fetch command sent for this line is marked in the queue 300 at 506. (Also, note that a prefetched line can be fetched ahead of the fetch command depending on the polls).

If it is determined in operation 501 that a prefetch command is sent by the processor 40, all the criteria is checked in each item from the queue 300 (such as command sent is false, IA matches, operand (data) addresses matches, biggest stride, backward or forward fetch) at 502. Also, depending on if the prefetch command is a forward or backward search, the prefetched address is compared to the projected prefetch line address at 502. If a match is found between the prefetched address and the projected prefetch line address, the command sent for this line address is marked at 506. In FIG. 2, an example of the projected fetching line address for N instructions of line 201 would be 0x35FE49BC5, which should be the next operand address. Otherwise, if no match is found at 502, an error message is printed out to indicate that the cache line (e.g., of L1) is not prefetched at 505. If the stride is bigger (shown by the line 202 of FIG. 2), the simulation model 10 would have expected the next line 000000D24E672900for instruction LH prefetched first by the processor 40 since the operand address for LH instruction has a stride of 7.

Figure 6:
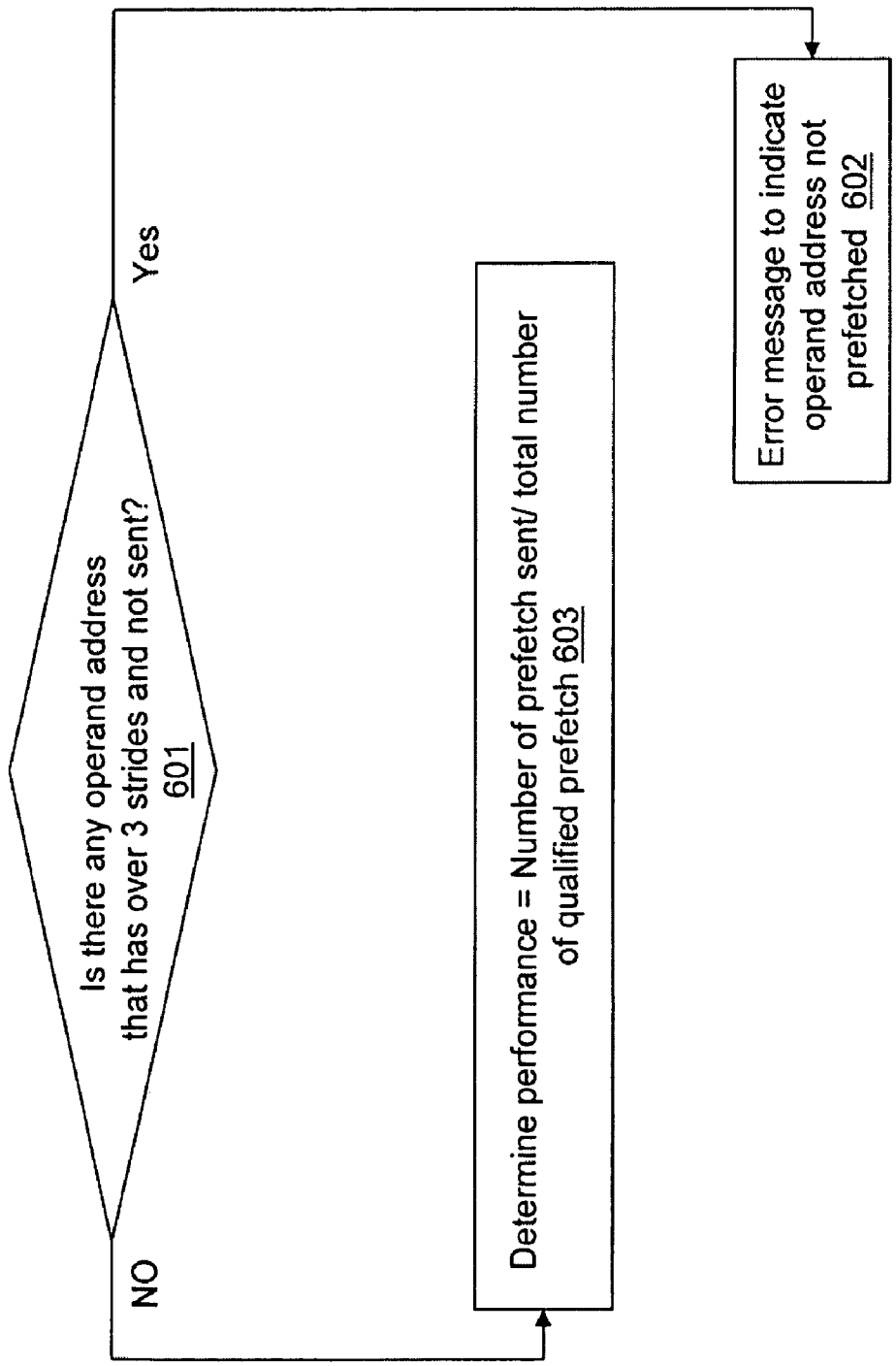
FIG. 6 illustrates a process for concluding the simulation in accordance with exemplary embodiments.

FIG. 6 illustrates a process for concluding the simulation in accordance with exemplary embodiments. FIG. 6 illustrates how the performance of the IA stride prefetch is calculated for the processor 40 and also indicates error conditions if lines having more than the designated strides do not get prefetched or fetched by the processor 40. It is understood that any number of strides can be designated (e.g., greater than 3).

The total number of items in the queue 300 that have more than 3strides are calculated and it is determined if those corresponding operand addresses are sent at 601. If no prefetch or fetch command is marked in the items that have more than 3strides at operation 601, an error message is printed out at 602. If a prefetch or fetch command has been marked at operation 601, the final performance of the processor 40 is calculated based on the statistics of the number of prefetched commands sent divided by the total number of the qualified prefetched lines at 603.

Figure 7B:
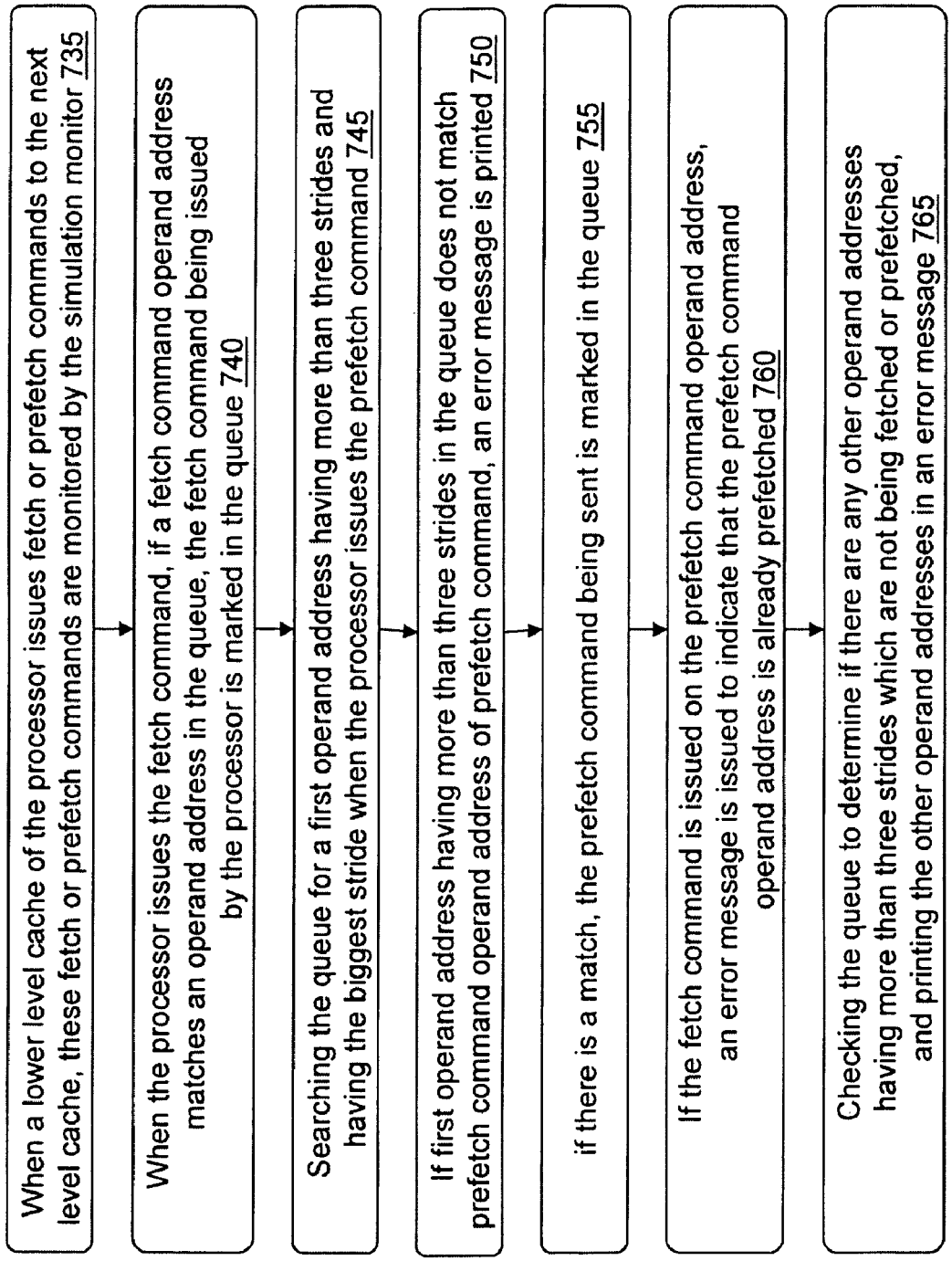

FIGS. 7A and 7B illustrate a method of verifying processor design in accordance with exemplary embodiments. It is understood that the various processes for the simulation may run through many cycles.

A plurality of instruction streams (data) are generated by the testcase generator 100, where each instruction stream has an instruction address (IA), where the instruction address has a plurality of operand fetch addresses within a prefetch boundary (e.g., two kilobytes), and where instructions in the plurality of instruction streams loop back to corresponding instruction addresses for the instructions at 700. Information relating to the plurality of instruction streams is stored in the queue 300 at 705.

The plurality of instructions streams are dispatched to the processor 40 to process the plurality of instruction streams at 710. The plurality of instructions streams are dispatched to the simulation model application 103 to process the plurality of instruction streams at 715. When a particular instruction of the plurality of instruction streams is being dispatched, the particular instruction's instruction address. (IA) and operand address are recorded in the queue 300 at 720. When the operand address for the particular instruction has more than three strides, the strides of the particular instruction are recorded in the queue 300 at 725.

A simulation monitor 102 monitors fetch commands and prefetch commands processed by the processor 40 at 730. When a lower level cache of the processor 40 issues fetch or prefetch commands to the next level cache, these fetch or prefetch commands are monitored by the simulation monitor 102 at 735.

When the processor 40 issues the fetch command, if a fetch command operand address for a line of the processor matches an operand address in the queue 300, the fetch command being issued by the processor 40 is marked in the queue 300 at 740. For example, when the L1 cache of the processor 40 issues fetch or prefetch commands to the next level cache, these fetch or prefetch commands are monitored by the simulation monitor 102, and if the line of the processor 40 for the fetch command matches the line address (operand address) in the queue 300, the fetch command being sent is marked in the queue 300.

When the processor 40 issues the prefetch command, the queue 300 is searched for a (first) operand address having more than three strides and having the biggest stride at 745. If the (first) operand address having more than three strides in the queue 300 does not match the prefetch command operand address of the prefetch command, an error message is printed at 750. Also, if there is a match, the prefetch command being sent is marked in the queue at 755. If, subsequently, the fetch command is issued on the prefetch command operand address, an error message is issued to indicate that the prefetch command operand address has already been prefetched at 760.

The queue 300 is checked to determine if there are any other operand addresses having more than three strides which are not being fetched or prefetched at 765. If there are other operand addresses, those other operand addresses are printed out in an error message.

Further, in accordance with exemplary embodiments, the performance of instruction address stride prefetches can be calculated by dividing a total number of strides that are prefetched by a total number of operand addresses. The information in the queue 300 may comprise operand fetch addresses, number of strides for each instruction, distance of strides, whether the strides are forward or backward strides, fetch commands sent, and prefetch commands blocked.

Also, in the plurality of instruction streams, respective instruction addresses are repeated a predefined number of times. The respective instruction addresses, each have a predefined number of corresponding operand addresses. The corresponding operand addresses for the respective addresses are offset from each other by a predefined number of bits.

Technical effects and benefits include the ability to for verify the out of order instruction address stride prefetch performance of a processor design having a high demand of the data crunching in the processor design. This helps to ensure that the processor being designed performs as desired.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc., do not denote any order or importance, but rather the terms first, second, etc., are used to distinguish one element from another.

The invention claimed is:

1. A system for verifying out of order instruction address (IA) stride prefetch performance in a processor design having more than one level of cache hierarchies and a cache controller, comprising:
   a processor for executing instructions from memory;
   a testcase generator configured to generate a plurality of instruction streams, each instruction stream having an instruction address; wherein the instruction address has a plurality of operand fetch addresses within a prefetch boundary; and wherein instructions in the plurality of instruction streams loop back to corresponding instruction addresses for the instructions;
   a queue configured to store information relating to the plurality of instruction streams;
   a simulation application;
   wherein when the operand address for a particular instruction of the plurality of instruction streams has more than three strides, the simulation application records the strides of the particular instruction in the queue;
   wherein when the processor issues a fetch command, if the simulation application determines that a fetch command operand address for a line of the processor matches an operand address in the queue, the fetch command being issued by the processor is marked in the queue;
   the simulation application being configured to search the queue for a first operand address having more than three strides and having the biggest stride when the processor issues a prefetch command, wherein:
      if the first operand address having more than three strides in the queue does not match a prefetch command operand address of the prefetch command, the simulation application issues an error message;
      if there is a match, the simulation application marks the prefetch command being sent in the queue; and
      if, subsequently, the fetch command is issued on the prefetch command operand address, the simulation application issues an error message to indicate that the prefetch command operand address has already been prefetched.

2. The system of claim 1, wherein the plurality of instruction streams are dispatched by the testcase generator to the simulation application and the processor to process the plurality of instruction streams; and
   wherein when the particular instruction of the plurality of instruction streams is being dispatched, the simulation application records the particular instruction's instruction address and operand address in the queue.

3. The system of claim 1, further comprising a simulation monitor configured to monitor fetch commands and prefetch commands being processed by the processor;

wherein when a lower level cache of the processor issues fetch and prefetch commands to the next level cache, the simulation monitor monitors the fetch and prefetch commands.

4. The system of claim 1, wherein the simulation application checks the queue to determine if there are any other operand addresses having more than three strides which are not being fetched or prefetched, wherein the other operand addresses are issued in an error message by the simulation application.

5. The system of claim 1, wherein the simulation application calculates performance of instruction address stride prefetches by dividing a total number of strides that are prefetched by a total number of operand addresses.

6. The system of claim 1, wherein in the plurality of instruction streams, respective instruction addresses are repeated a predefined number of times; and wherein respective instruction addresses each have a predefined number of corresponding operand addresses.

7. The system of claim 6, wherein the predefined number of corresponding operand addresses for respective instruction addresses are offset from each other by a predefined number of bits.

8. A method on a computer for verifying out of order instruction address (IA) stride prefetch performance in a processor design having more than one level of cache hierarchies, comprising:

generating a plurality of instruction streams by the computer, each instruction stream having an instruction address (IA); wherein the instruction address has a plurality of operand fetch addresses within a prefetch boundary; and wherein instructions in the plurality of instruction streams loop back to corresponding instruction addresses for the instructions;

storing in a queue information relating to the plurality of instruction streams by the computer;

wherein when the operand address for a particular instruction of the plurality of instruction streams has more than three strides, the strides of the particular instruction are recorded in the queue; and wherein when the processor issues a fetch command, if a fetch command operand address for a line of the processor matches an operand address in the queue, the fetch command being issued by the processor is marked in the queue;

searching by the computer the queue for a first operand address having more than three strides and having the biggest stride when the processor issues a prefetch command, wherein:

if the first operand address having more than three strides in the queue does not match the prefetch command operand address of the prefetch command, an error message is printed;

if there is a match, the prefetch command being sent is marked in the queue; and if, subsequently, the fetch command is issued on the prefetch command operand address, an error message is issued to indicate that the prefetch command operand address has already been prefetched.

9. The method of claim 8, further comprising dispatching the plurality of instruction streams to a simulation application and a processor to process the plurality of instruction streams;

wherein when the particular instruction of the plurality of instruction streams is being dispatched, the particular instruction's instruction address and operand address are recorded in the queue.

10. The method of claim 8, further comprising monitoring, by a simulation monitor, fetch commands and prefetch commands being processed by the processor;

wherein when a lower level cache of the processor issues fetch and prefetch commands to the next level cache, the fetch and prefetch commands are monitored by the simulation monitor.

11. The method of claim 8, further comprising checking the queue to determine if there are any other operand addresses having more than three strides which are not being fetched or prefetched;

wherein the other operand addresses are issued in an error message.

12. The method of claim 8, further comprising calculating performance of instruction address stride prefetches by dividing a total number of strides that are prefetched by a total number of operand addresses.

13. The method of claim 8, wherein in the plurality of instruction streams, respective instruction addresses are repeated a predefined number of times; and wherein respective instruction addresses each have a predefined number of corresponding operand addresses.

14. The method of claim 13, wherein the predefined number of corresponding operand addresses for respective instruction addresses are offset from each other by a predefined number of bits.

15. A computer program product, tangibly embodied on a non-transitory computer readable medium, for verifying out of order instruction address (IA) stride prefetch performance in a processor design having more than one level of cache hierarchies, the computer program product including instructions for causing a computer to execute a method, comprising:

generating a plurality of instruction streams, each instruction stream having an instruction address (IA); wherein the instruction address has a plurality of operand fetch addresses within a prefetch boundary; and wherein instructions in the plurality of instruction streams loop back to corresponding instruction addresses for the instructions;

storing in a queue information relating to the plurality of instruction streams;

wherein when the operand address for a particular instruction of the plurality of instruction streams has more than three strides, the strides of the particular instruction are recorded in the queue; and wherein when the processor issues a fetch command, if a fetch command operand address for a line of the processor matches an operand address in the queue, the fetch command being issued by the processor is marked in the queue;

searching the queue for a first operand address having more than three strides and having the biggest stride when the processor issues a prefetch command, wherein:

if the first operand address having more than three strides in the queue does not match the prefetch command operand address of the prefetch command, an error message is printed;

if there is a match, the prefetch command being sent is marked in the queue; and if, subsequently, the fetch command is issued on the prefetch command operand address, an error message is issued to indicate that the prefetch command operand address has already been prefetched.

16. The computer program product of claim 15, further comprising calculating performance of instruction address stride prefetches by dividing a total number of strides that are prefetched by a total number of operand addresses.

17. The computer program product of claim 15, further comprising checking the queue to determine if there are any other operand addresses having more than three strides which are not being fetched or prefetched;
   wherein the other operand addresses are issued in an error message.

18. The computer program product of claim 15, wherein in the plurality of instruction streams, respective instruction addresses are repeated a predefined number of times; and
   wherein respective instruction addresses each have a predefined number of corresponding operand addresses.

19. The computer program product of claim 18, wherein the predefined number of corresponding operand addresses for respective instruction addresses are offset from each other by a predefined number of bits.

20. The computer program product of claim 15, further comprising monitoring, by a simulation monitor, fetch commands and prefetch commands being processed by the processor;
   wherein when a lower level cache of the processor issues fetch and prefetch commands to the next level cache, the fetch and prefetch commands are monitored by the simulation monitor.

\* \* \* \* \*